UNITED STATES PATENT OFFICE.

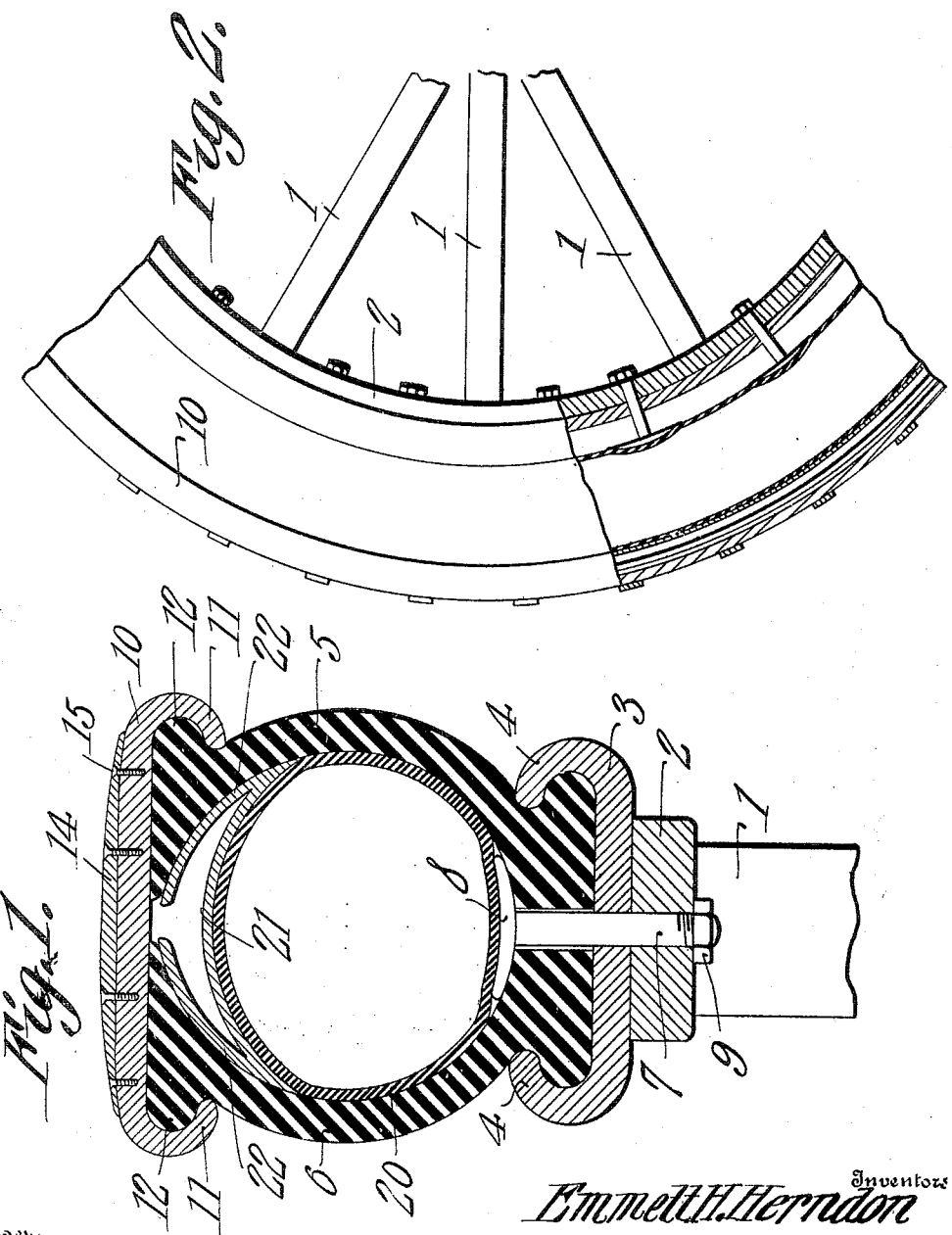

EMMETT H. HERNDON, OF SANFORD, FLORIDA, ASSIGNOR OF ONE-HALF TO RICHARD H. WHITNER, OF SANFORD, FLORIDA.

TIRE.

972,764.  Specification of Letters Patent.  Patented Oct. 11, 1910.

Application filed April 12, 1910. Serial No. 554,940.

*To all whom it may concern:*

Be it known that I, EMMETT H. HERNDON, a citizen of the United States, residing at Sanford, in the county of Orange and State of Florida, have invented a new and useful Tire, of which the following is a specification.

This invention relates to tires.

The objects of the invention are to improve the construction and increase the durability and strength of such devices.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of the claim without departing from the spirit of the invention.

In the accompanying drawings forming a part of this specification:—Figure 1 is a transverse section through a wheel rim and tire arranged in accordance with the present invention. Fig. 2 is a side elevation of the construction shown in Fig. 1, partly broken away in longitudinal section.

Like numerals indicate corresponding parts in both figures of the drawings.

Numeral 1 indicates spokes in an ordinary wheel and numeral 2 the felly thereof. Mounted upon the felly 2 is a clencher rim 3 having inwardly curled flanges 4.

The tire of the present invention comprises an outer casing which is made in two separate and similar sections 5 and 6, each of the sections being a counterpart of the other, the line of division of the two sections being along the center of the tread portion of the tire as well as along the center of the inner portion of the tire. The sections 5 and 6, at their inner portion, are held on the rim 2 by means of bolts 7 having enlarged heads 8 and nuts 9, the bolts 7 serving not only to hold the clencher sections 5 and 6 in the clencher rim 3, but also to hold said clencher rim upon the wheel. The outer or tread portions of the sections 5 and 6, are held together by an outer clencher rim 10, formed with inwardly curled flanges 11 embracing the annular ribs 12 which are formed upon the outer portions of the sections 5 and 6 of the tire casing.

The outer clencher rim 10, upon its tread portion, is roughened in any suitable manner to prevent skidding or sliding. In the embodiment of the invention disclosed, this roughening is produced by transverse strips 14 of leather, rubber or other suitable material, said strips 14 being secured upon the clencher rim 10 by means of rivets or screws 15. Located within the sections 5 and 6 of the outer casing is an inner tube 20 which is adapted to be inflated in the well known manner. The outer or tread portion of the inner tube is covered with a steel band or arch 21. Extending outwardly from the band or arch 21 are curved steel springs 22, the curve of which conforms to the curvature of the inner portions of the sections 5 and 6, the springs 22 thus converging toward each other at their outer ends as shown. The band or arch 21 serves to prevent damage to the inner tube 20 but in event that said tube should become deflated for any reason, the springs 22 will expand against the inner sides of the sections 5 and 6 and will thus hold them in such separate relation as will insure a continuance of the grip of the clencher rim 10 thereon.

The tire of the present invention is strong, simple, durable and inexpensive in construction and thoroughly efficient in operation.

What is claimed as new is:

A tire comprising a wheel rim, an inner clencher rim secured thereon, an outer casing formed in two sections, the inner portion of each being fitted into said clencher rim, an outer clencher rim for holding together the outer portions of the two sections of the outer casing, said outer portions being spaced from each other, an inner tube, a steel arch surrounding the outer portion of the inner tube and conforming in shape thereto, and outwardly extending, convergent, curved springs connected with the edges of said arch and pressed against the inner sides of the sections of said outer casing to hold them expanded, said springs and said arch being crescent shape in cross section, and the outer ends of said springs being spaced from each other and arranged adjacent the space between the two sections of the outer casing.

In testimony that I claim the foregoing as my own, I have hereto affixed my signature in the presence of two witnesses.

EMMETT H. HERNDON.

Witnesses:
J. C. McDANIEL,
R. C. MAXWELL.